(12) United States Patent
Blackmer et al.

(10) Patent No.: US 9,404,774 B2
(45) Date of Patent: Aug. 2, 2016

(54) INSTRUMENT PANEL ASSEMBLY WITH VARIABLE LENGTH POINTER

(71) Applicant: DELPHI TECHNOLOGIES, INC., Troy, MI (US)

(72) Inventors: Stephen C. Blackmer, Millington, MI (US); Steven A. Liburdi, Grosse Pointe Farms, MI (US)

(73) Assignee: Delphi Technologies, Inc., Troy, MI (US)

( * ) Notice: Subject to any disclaimer, the term of this patent is extended or adjusted under 35 U.S.C. 154(b) by 145 days.

(21) Appl. No.: 14/486,176

(22) Filed: Sep. 15, 2014

(65) Prior Publication Data

US 2016/0076922 A1    Mar. 17, 2016

(51) Int. Cl.
*G01D 13/22*        (2006.01)
*B60K 37/02*        (2006.01)

(52) U.S. Cl.
CPC ............... *G01D 13/22* (2013.01); *B60K 37/02* (2013.01); *B60K 2350/408* (2013.01)

(58) Field of Classification Search
USPC ...................................... 116/284, 328, DIG. 6
See application file for complete search history.

(56) References Cited

U.S. PATENT DOCUMENTS

2013/0118398 A1\*    5/2013    Prudham .................. G01D 7/00
                                                                          116/303

FOREIGN PATENT DOCUMENTS

FR            2902885 A1 \* 12/2007 .............. B60K 37/02
JP    DE 19610059 A1 \*  9/1996 ................ G01R 7/06

OTHER PUBLICATIONS

English translation of DE 19610059 A1.\*
English translation of FR 2902885 A1.\*

\* cited by examiner

*Primary Examiner* — Daniel S Larkin
*Assistant Examiner* — Irving A Campbell
(74) *Attorney, Agent, or Firm* — Lawrence D. Hazelton

(57) ABSTRACT

An instrument panel assembly for displaying vehicle information includes a pointer and a magnetic device. The pointer is operable to move about an axis to point at indicia defined by the assembly. The pointer is also operable to vary a length of the pointer in response to a magnetic field proximate to the pointer. The magnetic is device configured to cooperate with the pointer to vary the length of the pointer.

7 Claims, 5 Drawing Sheets

INSTRUMENT PANEL ASSEMBLY WITH VARIABLE LENGTH POINTER

TECHNICAL FIELD OF INVENTION

This disclosure generally relates to an instrument panel assembly for displaying vehicle information, and more particularly relates to a variable length pointer that varies length in response to a magnetic field.

BACKGROUND OF INVENTION

As vehicles become more sophisticated, it is necessary to convey more information to an operator of a vehicle. For example, vehicle systems such as traction control, occupant protection (e.g. air-bags), anti-lock braking, cruise control, and forward and reward illumination are often configured to perform self-diagnostic tests. If a self-diagnostic test detects a problem with a system, a graphical indicator or telltale on a vehicle instrument panel may be illuminated to inform the operator of the problem. As the number of graphical indictors increases, but the area of the instrument panel display surface remains the same, instrument panel assemblies that employ mechanical pointers may have situations where the pointer undesirable obstructs the view of the graphical indicator. Also, the number of mechanical pointers that an instrument panel can include is limited by the area of the display that is swept by the mechanical pointers. If the swept areas overlap or intersect, there is a risk of adjacent mechanical pointers colliding. Furthermore, some of the display area of the assembly may not be fully utilized because of circular shape of the area swept by the pointer.

SUMMARY OF THE INVENTION

Described herein is an instrument panel assembly that used a variable length pointer to overcome the problems described above. In general, the assembly makes use of magnetic attraction/repulsion to vary the length of the pointer.

In accordance with one embodiment, an instrument panel assembly for displaying vehicle information is provided. The assembly includes a pointer and a magnetic device. The pointer is operable to move about an axis to point at indicia defined by the assembly. The pointer is also operable to vary a length of the pointer in response to a magnetic field proximate to the pointer. The magnetic is device configured to cooperate with the pointer to vary the length of the pointer.

Further features and advantages will appear more clearly on a reading of the following detailed description of the preferred embodiment, which is given by way of non-limiting example only and with reference to the accompanying drawings.

BRIEF DESCRIPTION OF DRAWINGS

The present invention will now be described, by way of example with reference to the accompanying drawings, in which.

DETAILED DESCRIPTION

Figure 1:
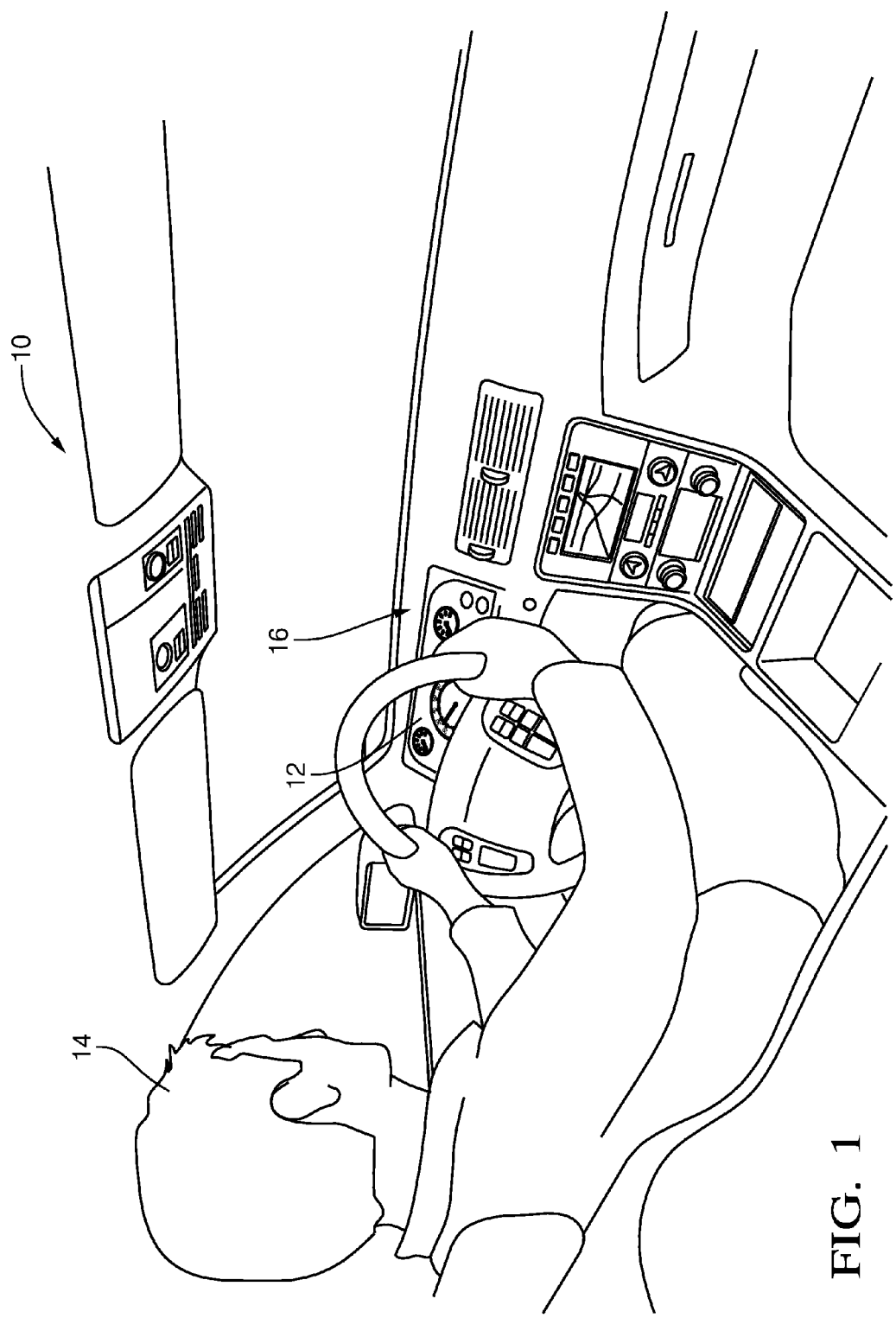
FIG. 1 is a perspective view of a vehicle interior equipped with an instrument panel assembly in accordance with one embodiment.

FIG. 1 illustrates a non-limiting example of a vehicle 10 equipped with an instrument panel assembly, hereafter referred to as the assembly 12, installed into a dashboard 16 of the vehicle 10. In general, the assembly 12 displays vehicle information to an operator 14 of the vehicle 10 such as vehicle speed, engine coolant temperature, and the like.

Figure 2:
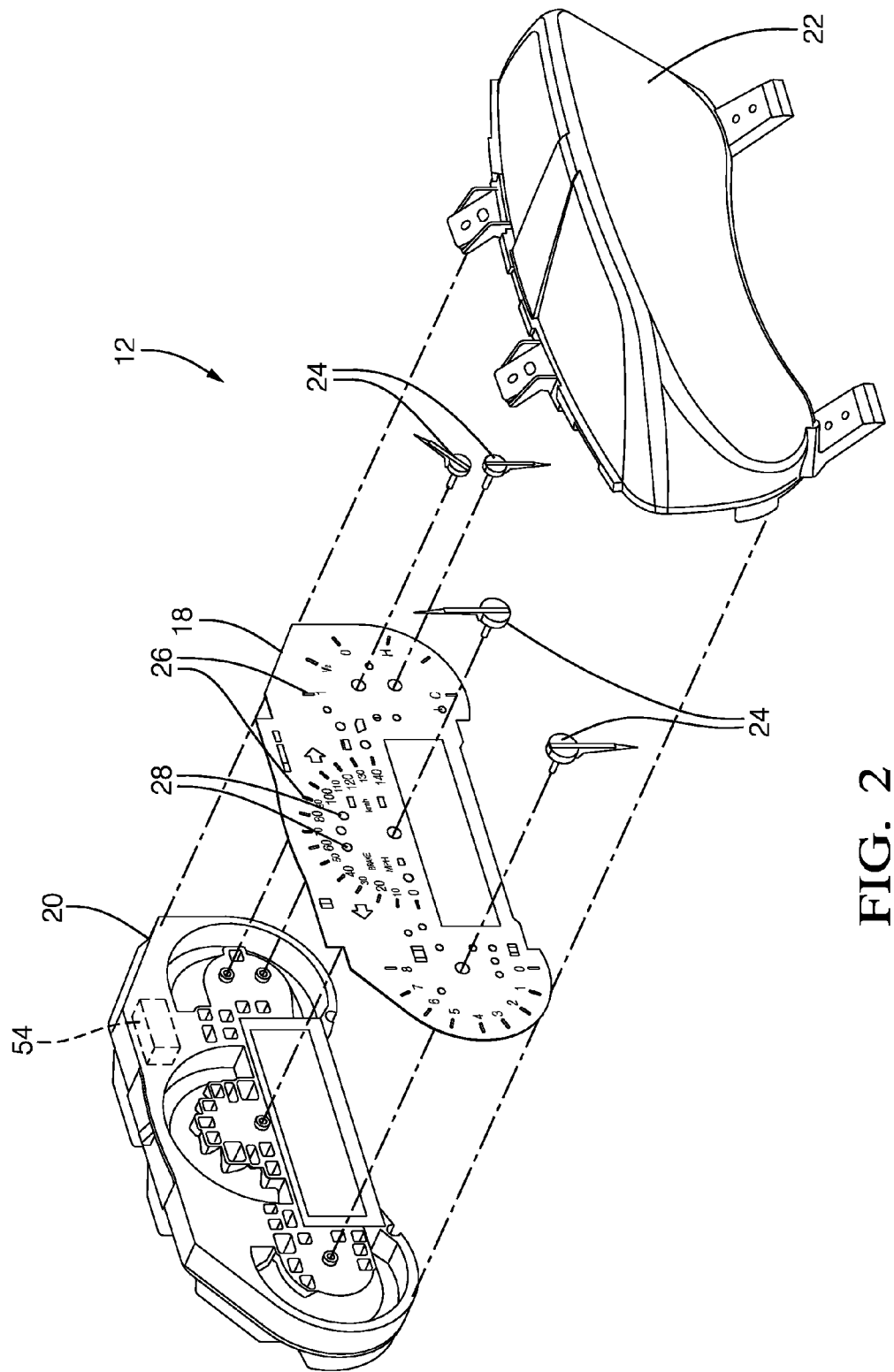
FIG. 2 is an exploded perspective view of part of the assembly of FIG. 1 in accordance with one embodiment.

FIG. 2 illustrates a non-limiting example of the assembly 12 as it might appear when not installed into the dashboard 16 of the vehicle 10. In general, the assembly 12 includes an applique 18. In this example the applique 18 spans most of the viewing area of the assembly 12. The assembly 12 also typically includes a base 20 and a lens 22 for supporting various parts that make up the assembly 12 and protecting the pointers 24 and the applique 18 from contact damage and contaminants. The applique 18 typically includes indicia 26 that the pointers 24 point at to convey information to the operator 14. The applique may also one or more include graphical indicators 28 configured to become visibly apparent to the operator 14 when suitably backlit. Non-limiting examples of the graphical indicators 28 include a high-beam indicator and a parking brake indicator, as will be recognized by those in the art.

Figure 5:
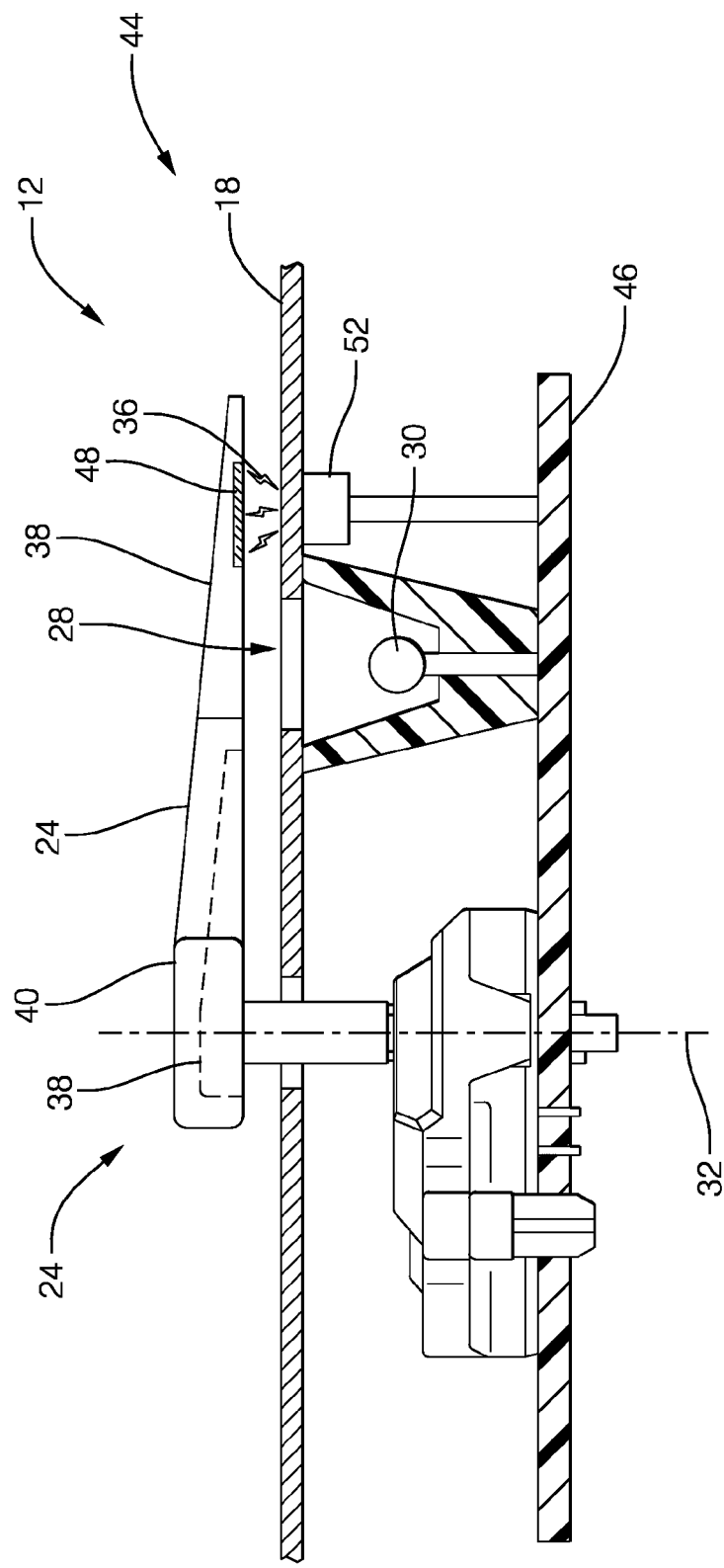
FIG. 5 is a side view of part of the assembly of FIG. 1 in accordance with one embodiment.

Backlighting of the applique 18 and selective illumination of the graphical indicators 28 is generally provided by a number of light sources, for example an indicator light source 30 (FIG. 5). These light sources are preferably light emitting diodes (LEDs), as LEDs are reliable, economical, and typically generate less heat than other types of light sources such as incandescent bulbs. However, the assembly 12 described herein is not limited to using LEDs as light sources.

Figure 3:
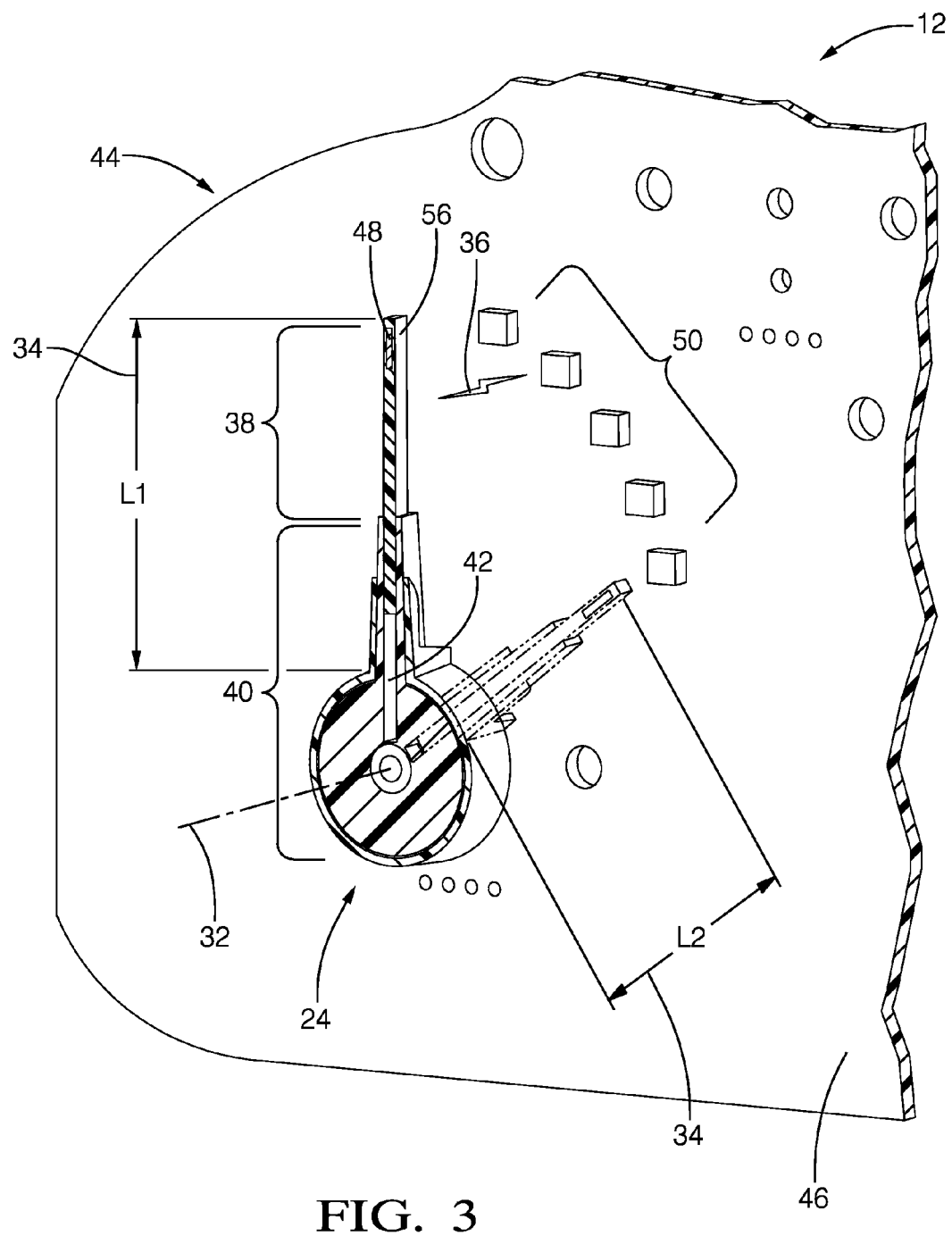
FIG. 3 is an isometric view of part of the assembly of FIG. 1 in accordance with one embodiment.

FIG. 3 further illustrates non-limiting features of the assembly 12 by removing the applique (18 in FIG. 2) so the interaction between the pointer 24 and other objects can be more easily understood. In general, the pointer 34 is operable to move about an axis 32 to point at indicia 26 (FIG. 2) defined by the assembly 12. A key feature of the pointer 24 described herein is that the pointer 24 is configured or operable to vary a length 34 of the pointer 24 in response to a magnetic field 36 proximate to the pointer 24. The length 34 may be continuously variable between an extended length L1 and a retracted length L2. To vary the length 34 of the pointer 24, the pointer may include a fixed portion 40 and retractable portion 38. As used herein, the fixed portion 40 refers to the idea that the radial length of the fixed portion 40 is not variable, and is not intended to imply that the pointer 24 rotational fixed, i.e. the pointer 24 is able to rotate about the axis 32. The fixed portion 40 may define a slot 42 that the retractable portion 38 can move into to vary the length 34 toward the retracted length L2.

The assembly also includes a magnetic device 44 configured to cooperate with the pointer 24 to vary the length 34 of the pointer 24. As used herein, the magnetic device 44 generally includes a part to generate the magnetic field 36, and a part that is acted upon by the magnetic field 36. As will be explained in more detail below, the magnetic device 44 may include a permanent magnet or an electromagnet, which may be located on or attached to the pointer 24, or may be located on or attached to a circuit board 46 behind the applique (18 in FIG. 2). It is contemplated that there are many ways to use magnetic attraction/repulsion to vary the length of the pointer, so it is noted that the scope of the assembly 12 described herein is not limited to the examples presented herein.

The advantages of a variable length pointer include, but are not limited to, being able to retract the pointer 24 so it does not collide with or contact another nearby pointer (not show), or so that the pointer 24 does not obstruct the viewing of a graphical indicator 28. Furthermore, the variable length may provide an additional means to attract the attention of the operator 14 or make the appearance of the assembly more pleasing by, for example, making the pointer 24 longer when a critical condition is being indicated such as the operating temperature of the vehicle's engine is too high, or the oil pressure of the vehicle's engine is too low.

In one example, the magnetic device 44 includes a permanent magnet 48 attached to the pointer 24, for example the retractable portion 38 of the pointer. Accordingly, the assembly 12 is configured to provide or generate the magnetic field 36 to vary the length 34 of the pointer 24. By way of further example, the magnetic field 36 may be provided by an array of permanent magnets, hereafter referred to as the array 50, which may be mounted on the circuit board 46 at a location proximate to the area swept by the pointer 24 as the pointer rotates about the axis. In this example the array 50 is arranged so the radial distance of each magnet in the array 50 from the axis 32 decreases as the angular orientation changes. Then, as the pointer 24 sweeps from the twelve o'clock position to the two o'clock position, the length 34 varies from the extended length L1 to the retracted length L2.

Alternatively, the array 50 may include electromagnets instead of permanent magnets. Then if the electromagnets are not activated, the pointer 24 may selectively stay at the extended length L1 regardless of the angular orientation of the pointer 24, or if the electromagnets are activated the length 34 may vary in the same manner as would be the case for the array 50 being formed of permanent magnets. It is recognized that the pointer 24 may include a spring (not shown) or other means to urge the retractable portion 38 away of from the fixed portion 40 so that the pointer is at the extended length L1 when no electromagnet is activated.

Figure 4:
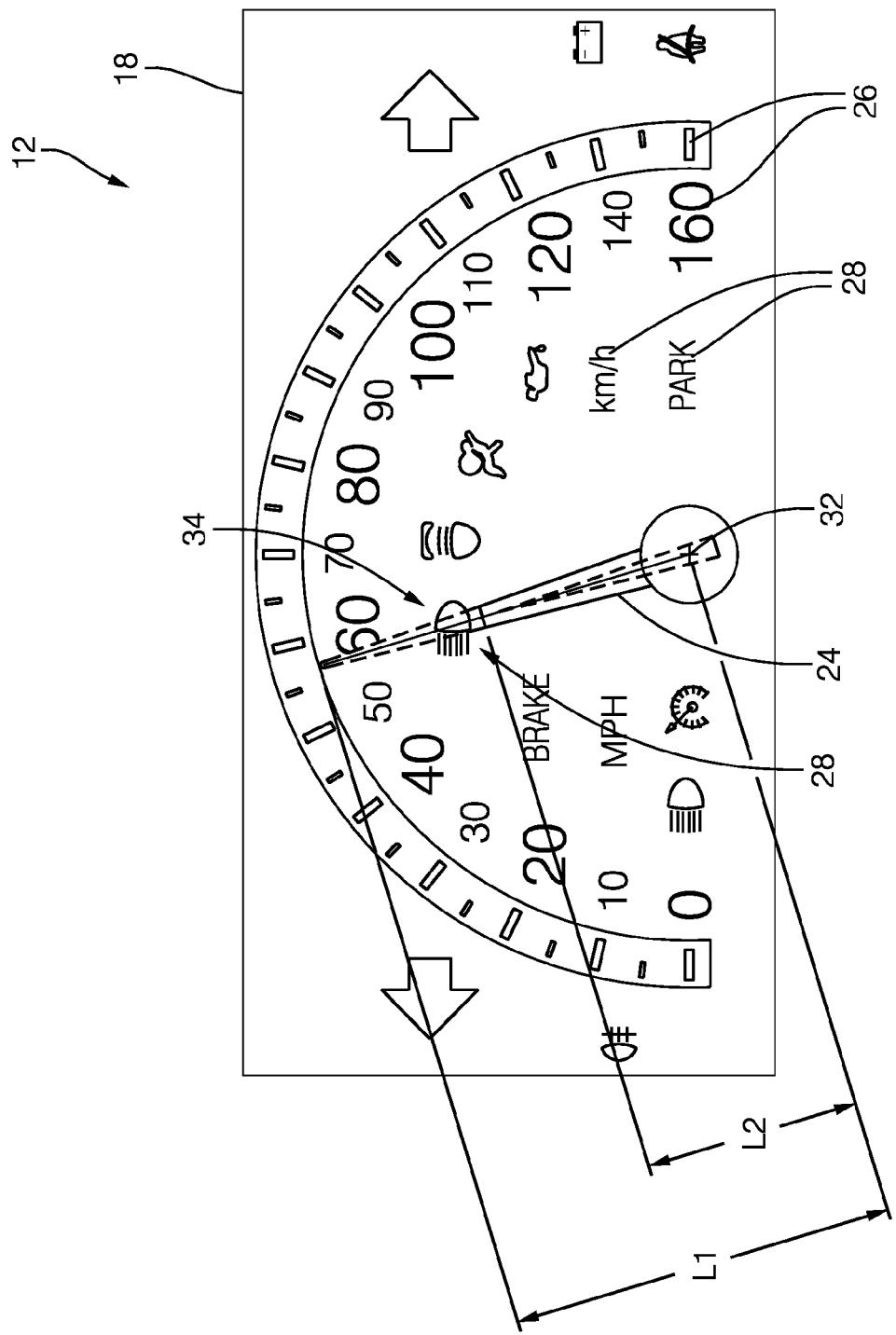
FIG. 4 is a front view of part of the assembly of FIG. 1 in accordance with one embodiment.

FIGS. 4 and 5 illustrate another non-limiting example of the assembly where the magnetic device 44 includes an electromagnet 52 arranged proximate to the pointer 24. The electromagnet 52 is configured to provide the magnetic field 36 to vary the length 34 of the pointer 24. By way of further example, if the high-beam indicator (one of the graphical indicators 28 illustrated) is not illuminated, then the electromagnet would not be activated and the pointer would remain at the extended length L1 if the pointer 24 swept over the high beam indicator. However, if the high-beam indicator was illuminated, a controller 54 (FIG. 1) may operate the electromagnet 52 so that the pointer 24 was urged by the magnetic field 36 to the retracted length L2. While the electromagnet 52 is illustrated with the appearance generating the magnetic field at only one location proximate to the high beam indicator, it is contemplated that the electromagnet could be configured to generate a field that held the pointer 24 in at the retracted length L2 regardless of the angle of the pointer 24. That is, with reference to FIG. 4, the pointer 24 could stay at the retracted length L2 or the extended length L1 regardless of the speed being indicated, and only dependent on the activation of the electromagnet 52.

The pointer 24 may be equipped with a permanent magnet 48 attached to the retractable portion 38 of the pointer 24. As mentioned before, the permanent magnet 48 cooperates with the electromagnet 52 to vary the length 34 of the pointer 24. Alternatively, the permanent magnet 48 may be replaced by a core 56 formed of ferromagnetic material attached to the pointer 24 that cooperates with the electromagnet 52 to vary the length 34 of the pointer 24. By installing an iron core (i.e. the core 56) instead of the permanent magnet 48 onto the retractable portion, the movement of the retractable portion 38 relative to the magnetic field 36 is comparable to that of an iron core in a solenoid.

Accordingly, an instrument panel assembly (the assembly 12) with a variable length pointer (the pointer 24) is provided. The assembly 12 makes use of use magnetic attraction/repulsion to vary the length 34 of the pointer 24. Having a variable length pointer is advantageous as multiple pointers can be more closely arranged on the display surface of the assembly without risk of pointers colliding with one another, and the graphical indicators 28 can be located within the area of the display surface swept by the pointer 24 without the risk of having the pointer obstruct the operators ability to view the graphical indicators 28.

While this invention has been described in terms of the preferred embodiments thereof, it is not intended to be so limited, but rather only to the extent set forth in the claims that follow.

We claim:

1. An instrument panel assembly for displaying vehicle information, said assembly comprising:
    a pointer operable to move about an axis to point at indicia defined by the assembly, wherein the pointer is operable to vary a length of the pointer in response to a magnetic field proximate to the pointer; and
    a magnetic device configured to cooperate with the pointer to vary the length of the pointer.

2. The assembly in accordance with claim 1, wherein the magnetic device includes a permanent magnet attached to the pointer, and the assembly is configured to provide a magnetic field to vary the length of the pointer.

3. The assembly in accordance with claim 2, wherein the magnetic field is provided by an array of permanent magnets arranged proximate to the pointer.

4. The assembly in accordance with claim 2, wherein the magnetic field is provided by an electromagnet arranged proximate to the pointer.

5. The assembly in accordance with claim 1, wherein the magnetic device includes an electromagnet arranged proximate to the pointer and configured to provide a magnetic field to vary the length of the pointer.

6. The assembly in accordance with claim 5, wherein the assembly includes a permanent magnet attached to the pointer that cooperates with the electromagnet to vary the length of the pointer.

7. The assembly in accordance with claim 5, wherein the assembly includes a core formed of ferromagnetic material attached to the pointer that cooperates with the electromagnet to vary the length of the pointer.

* * * * *